United States Patent [19]

Binzen et al.

[11] Patent Number: 4,655,401
[45] Date of Patent: Apr. 7, 1987

[54] ROTARY CAR DUMPER WITH LUMP BREAKER APPARATUS

[75] Inventors: Willard Binzen, Gibsonia; Samuel P. Insana, Washington, both of Pa.; Edward T. Manning, Jr.; Cornel Muhoray, both of Bay Village, Ohio

[73] Assignee: Dravo Corporation, Pittsburgh, Pa.

[21] Appl. No.: 768,495

[22] Filed: Aug. 22, 1985

[51] Int. Cl.⁴ ............................................. B02C 13/286
[52] U.S. Cl. ........................................ 241/69; 241/81; 241/101.7; 241/189 R
[58] Field of Search ............... 241/101.7, 101.2, 101.5, 241/186.4, 189 R, 81, 88.4, 1, 69; 414/354, 355, 359, 363, 578, 579

[56] References Cited

U.S. PATENT DOCUMENTS

| | | | |
|---|---|---|---|
| 433,777 | 8/1890 | Emerson et al. | 241/81 |
| 1,973,163 | 9/1934 | Davis. | |
| 2,524,888 | 10/1950 | Fish. | |
| 3,148,837 | 9/1964 | Doolin | 241/1 |
| 3,181,799 | 5/1965 | Wurzburg et al. | 241/1 |
| 3,800,858 | 4/1974 | Placek | 241/1 X |
| 3,934,826 | 1/1976 | Graveman | 241/81 |

FOREIGN PATENT DOCUMENTS

| | | | |
|---|---|---|---|
| 665940 | 6/1979 | U.S.S.R. | 241/88.4 |
| 963557 | 2/1982 | U.S.S.R. | 241/81 |

Primary Examiner—Mark Rosenbaum
Attorney, Agent, or Firm—Parmelee, Miller, Welsh & Kratz

[57] ABSTRACT

A lump breaker apparatus for a rotary car dumper includes a porous barrier means in the form of a grizzly element, having sized openings therein and positioned in the flow path of the discharged bulk material prior to its entry into the hopper pit. Motorized impact means, preferably rotatable drum means, having a plurality of outwardly protruding striking elements, is mounted on the frame of the rotary dumper, extending between the end plates thereof and moveable with the frame. The impact means is selectively activated to engage and breakup lumps of oversized bulk material retained on the grizzly during a dumping cycle.

13 Claims, 8 Drawing Figures

ROTARY CAR DUMPER WITH LUMP BREAKER APPARATUS

BACKGROUND OF THE INVENTION

The present invention relates generally to apparatus for emptying railroad cars carrying bulk material by rotating them about their longitudinal axis to dump the contents over the side of the cars into a hopper below and, thence, to a take-away system. More particularly, it relates to such a rotary car dumper which incorporates an efficient lump breaker apparatus to interrupt the flow of large lumps of dumped material and reduce the size of the lumps prior to entry to the hoppers and take-away system, whereby blockage of said system is prevented.

It is common practice to employ rotary car dumpers to empty long trainloads of bulk material, such as coal, various ores, and the like, wherein the trains may contain upwards of 100 to 150 loaded cars. In such operations, fast and dependable unloading of the rail cars, with little or no stoppage, is important in order to minimize the expense thereof. Bulk material being hauled by railway cars, however, commonly contains oversized lumps of product or the hauled material may freeze and form large lumps during transit in the winter months. Oftentimes when these cars are dumped on a rotary car dumper, the lumps are of such size that they easily plug-up the take-away system causing a subsequent shutdown of the unloading operation. The shutdown continues until the lumps are cleared. It is present practice in the art to install so-called "grizzly bars" with sized openings therein to prevent passage of large lumps into the take-away system. These grizzlies are usually positioned above the open hopper which lies beneath the rotary dumper. The large lumps retained on the grizzly are then broken up by portable and/or stationary equipment, such as dozers, track mounted hammermills, crushers, grinders, saws, manual picks and the like. Many things can prevent the commonly used breaker equipment from doing their intended job, e.g., the lumps may be buried in the flow of bulk material and, therefore, not accessible to the breaker, or the lumps may be too large to reach the breakers or may get hung up on some portion of the structure.

Presently known hammermill type breakers are track mounted on the stationary grizzly above the hopper pit area and travel beneath the rotary dumper in a direction parallel with the longitudinal axis thereof to break the lumps remaining on the grizzly after dumping. This prior arrangement requires approximately 4 feet of additional headroom to permit the hammermill to clear the bottom of the end rings of the dumper. This necessarily results in a more expensive dumper since the dumper pit must be deeper in order to accommodate the required, additional headroom and makes the retrofit of an existing dumper installation cost prohibitive.

The present invention solves many of the problems heretofore encountered in dumping bulk material containing oversized lumps or frozen portions therein, by providing a lump breaker apparatus which is mounted on the rotary dumper instead of in the hopper area. Since the breaker is supported directly on the dumper frame, the requirement for separate foundation supports for a breaker is eliminated. The present invention further provides a lump breaker in which the dumper operator has visual control over the positioning of the lumps and can selectively activate the lump breaker apparatus when required. Still further, the invention provides a lump breaker apparatus which is easily adaptable to be retrofitted to the end rings of a rotary car bumper presently in operation, without any modification or additions to the foundation structure thereof. The lump breaker device of the present invention requires no additional headroom beneath the dumper frame, thus, the dumper pit need not be deepened. Since the rotating lump breaker apparatus extends between the end rings of the dumper, minimum clearance between the end rings and the upper surface of the discharge hopper is possible. Likewise, no additional travel drive mechanism is required as is the case in the heretofore known hammermill-type traveling lump breakers of the prior art. Since the motorized lump breaker apparatus of the invention is mounted on the rotary dumper, it is less prone to damage due to its relatively safe location above the track level. The lump breaker of the present invention is easily controlled by the dumper operator and also very accessible for maintenance purposes.

SUMMARY OF THE INVENTION

Apparatus according to the present invention is suitable for use with rotary car dumpers presently in service or in new installations. Such rotary car dumpers include a cylindrical frame constructed of two end rings joined by elongated members, including front and rear girders, with a section of railroad track extending through the frame and parallel to its longitudinal axis. The rotatable frames are closed on circular ends with vertical end plates which have an opening through which the railroad car enters and leaves the frame. The structure includes means for rotating the end rings in order to dump the contents of the railroad car over one side thereof into an open hopper pit located beneath the rotatable frame. Porous barrier means, in the form of a grizzly, having a plurality of sized openings therein, is positioned in the dumping path of the bulk material to permit the particulate bulk material to pass through the sized openings while retaining oversized lumps of the material thereon. Lump breaker impact means, preferably in the form of a cylindrical drum or drums, having a plurality of outwardly protruding attack bits of hardened material, is attached to and movable with the dumper frame and longitudinally extends between the end plates thereof. The impact means may be selectively energized by the dumper opeator to rotatably engage and breakup the oversized lumps of bulk material retained on the porous barrier means during a dumping cycle. In a presently preferred embodiment of the invention, the impact means is mounted on the dumper frame above the top of the rail car. The porous barrier means extends from the elongated members of the dumper frame upwardly above the side of the rail car and terminates above the open end thereof, adjacent to the impact means and spaced outwardly therefrom. In this embodiment, as the car dumper rotates, the free flowing bulk material passes through the sized openings in the porous barrier means to the hopper pit. Oversized lumps are retained on the porous barrier means until the rotating dumper reaches a given angle, whereupon the lumps of bulk material slide or roll down the retaining surface thereof into engagement with the rotating teeth of the impact breaker means. The breaker then reduces the size of the lumps to a point where they pass through the sized openings of the porous barrier means and into the hopper pit. Should any of the lumps not come in contact with the rotating breaker or fail to breakup, the operator can visually observe this and return the dumper to its upright position and rotate it again or he can leave the lump in the car and index the positioner mechanism to dump the next car. In a slightly modified version of the above-described embodiment, the lump breaker apparatus may include a second impact/breaker means and porous barrier means mounted on the other side of the rail car in order to handle particularly troublesome loads, such as those which would be encountered in winter months in the transport of coal.

In another presently preferred embodiment of the invention, the motorized impact means comprises an elongated breaker drum which longitudinally extends between the end plates of the car dumper frame and is rotatably supported at its end shafts by a pair of arms which are pivotally affixed to the end plates at one end and to the shafts of the breaker drum at the other. The porous barrier means, in the form of a horizontal grizzly, is secured along the top of the discharge hoppers. A pair of parallel, spaced-apart rails are positioned on the grizzly and extend in a direction transverse to the longitudinal axis of the dumper frame. After the dumper has inverted, the breaker drum is selectively lowered from a parked position to an operable position adjacent the grizzly by activation of a motorized hoist which pays out wire rope cable connected to the support arms of the breaker drum. Upon rotation of the car dumper frame to the upright position, the motorized breaker drum rides on the aforementioned rails across the grizzly on the top of the hopper to break up any lumps of material retained thereon. Upon completion of the dumper cycle, the hoist is activated by the dumper operator and the breaker drum is pulled upwardly by the wire ropes into the parked position within the end rings of the dumper. In this embodiment, if the bulk material is particularly lump free, the operator may keep the lump breaker in its parked position in order to shorten the cycle time and minimize the wear on the breaker apparatus.

DETAILED DESCRIPTION OF THE INVENTION

Figure 1:
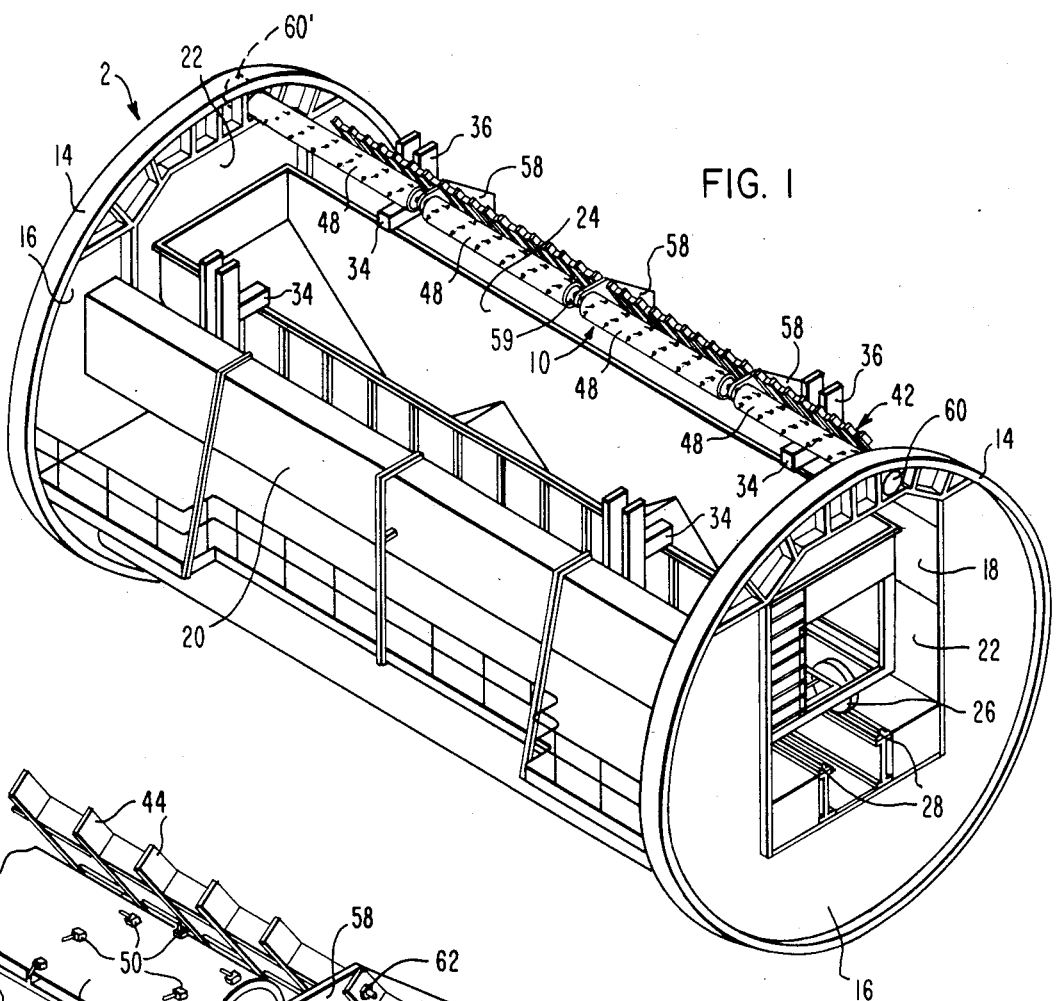
FIG. 1 is a perspective view of a rotary car dumper installation incorporating the subject invention.
Figure 2:
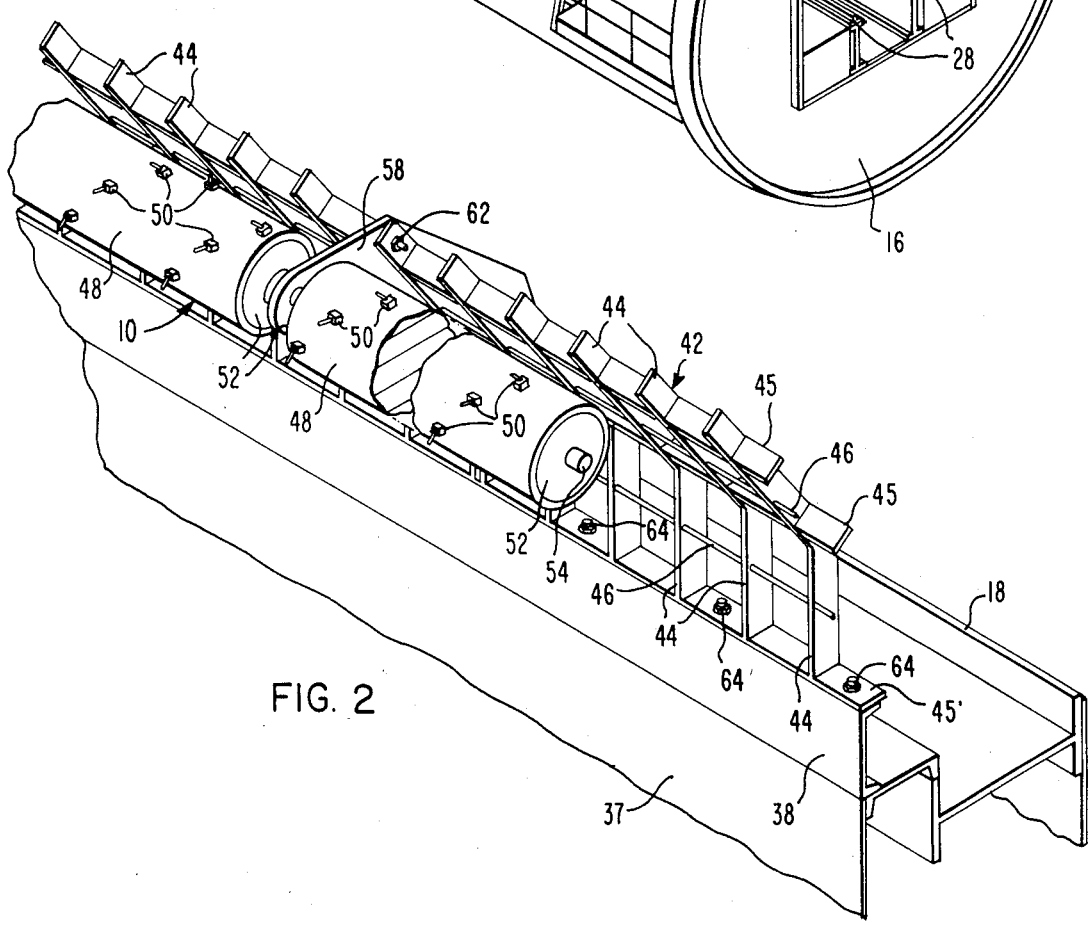
FIG. 2 is an enlarged, fragmentary perspective view of the lump breaker invention of FIG. 1.

As illustrated in the drawings, a rotary car dumper incorporating the present invention, includes a hopper pit 12 which may be circular or rectangular in plan view and a cylindrical car dumper having an open, rotatable frame 2. The dumper installation may be housed in an enclosure 4 and include an operator's cab 6 and other conventional structure such as plates 13 for deflecting material into the hopper pits 12 and a plurality of horizontally extending sill beams 8 positioned in spaced-apart array beneath the cylindrical frame 2. The dumper 2 is constructed of a pair of horizontally spaced end rings 14 interconnected by a number of structural girders including a front box girder 18 and rear box girder 20 which support floor plate members and a section of railroad track 28, the structural details of a dumper frame being well known in the art. The cylindrical frame 2 is open at its sides but is enclosed at the ends thereof by vertically extending circular end plates 16 fitted within the end rings 14. The end plates are provided with openings 22 through which a rail car 24 having wheels 26 can pass, FIG. 1.

Figure 3:
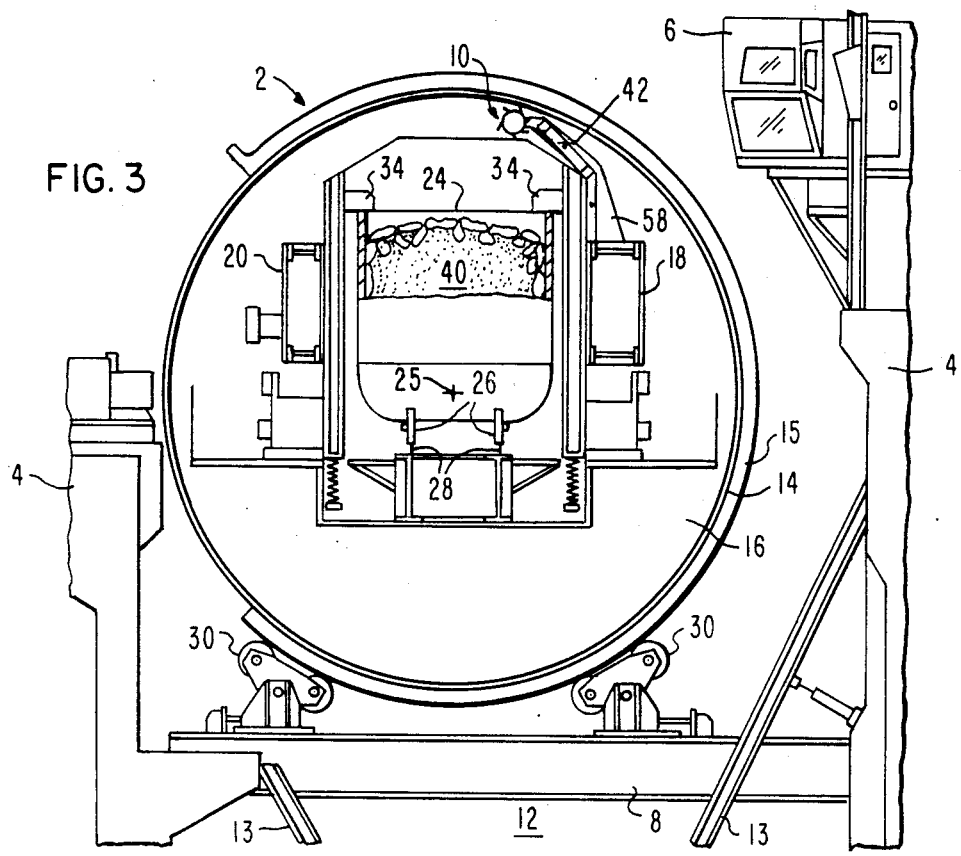
FIG. 3 is an end view of a car dumper apparatus depicting an embodiment of the invention shown in FIGS. 1 and 2.
Figure 4:
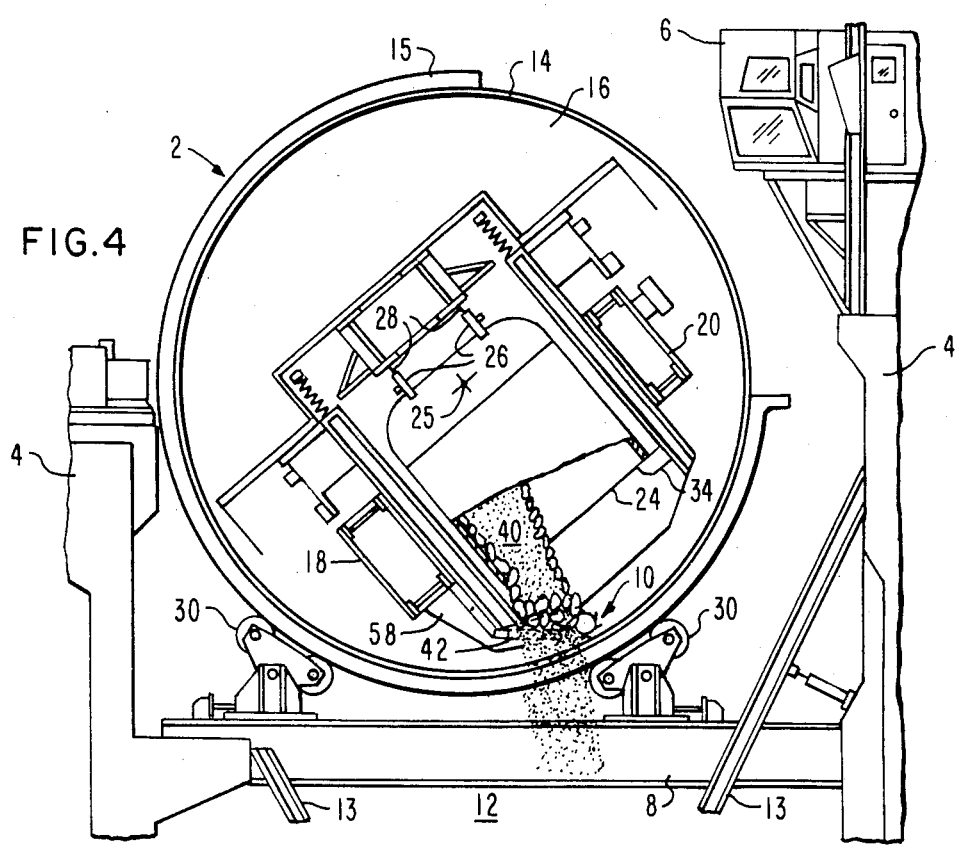
FIG. 4 is an end view of the car dumper of FIG. 3 with the car dumper rotated in a dumping position.

The cylindrical frame 2 is mounted for rotation about its longitudinal axis indicated in FIGS. 3 and 4 at 25 which, in unit trains, passes through the coupling of the rail car 24. The end rings 14 of the cylindrical frame ride on a pair of wheeled trunnions 30 when the frame is rotated by a motor gear reducer combination 32 which includes a positive rack and pinion rotation drive along a gear rack 15 adjacent the end rings, in conventional fashion. Of course, other known drives could be used to rotate the frame 2.

Figure 6:
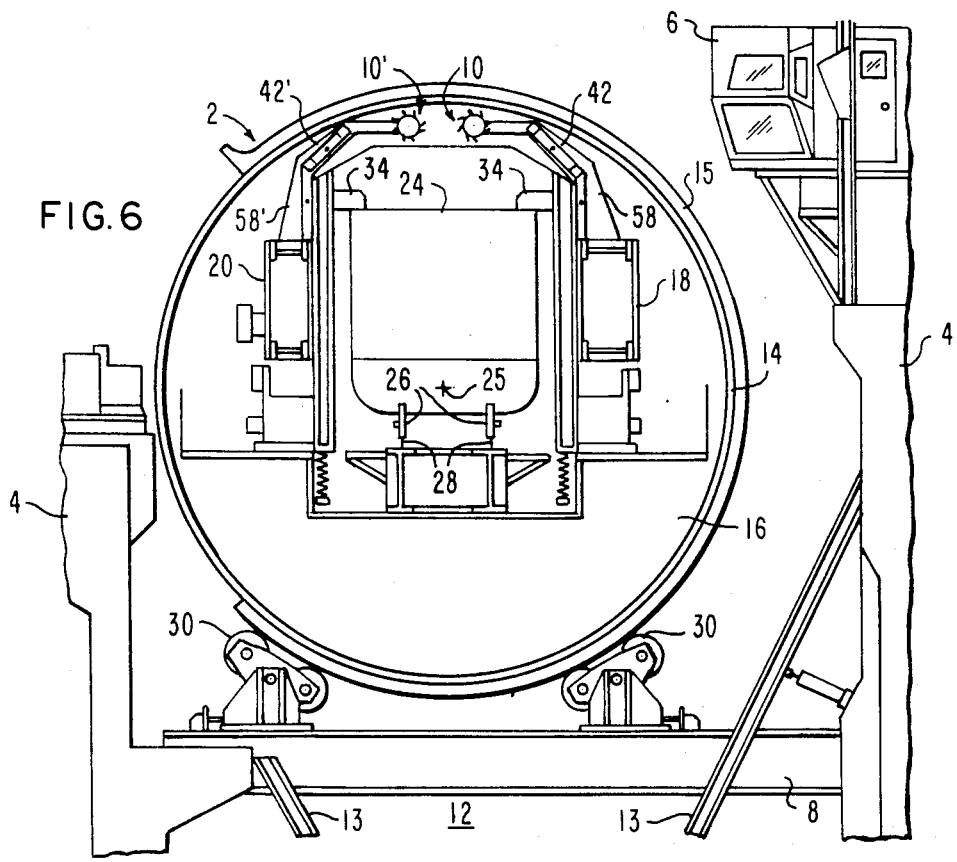
FIG. 6 is an end view of a car dumper showing another embodiment of the lump breaker means similar to that of FIGS. 1-5.
Figure 7:
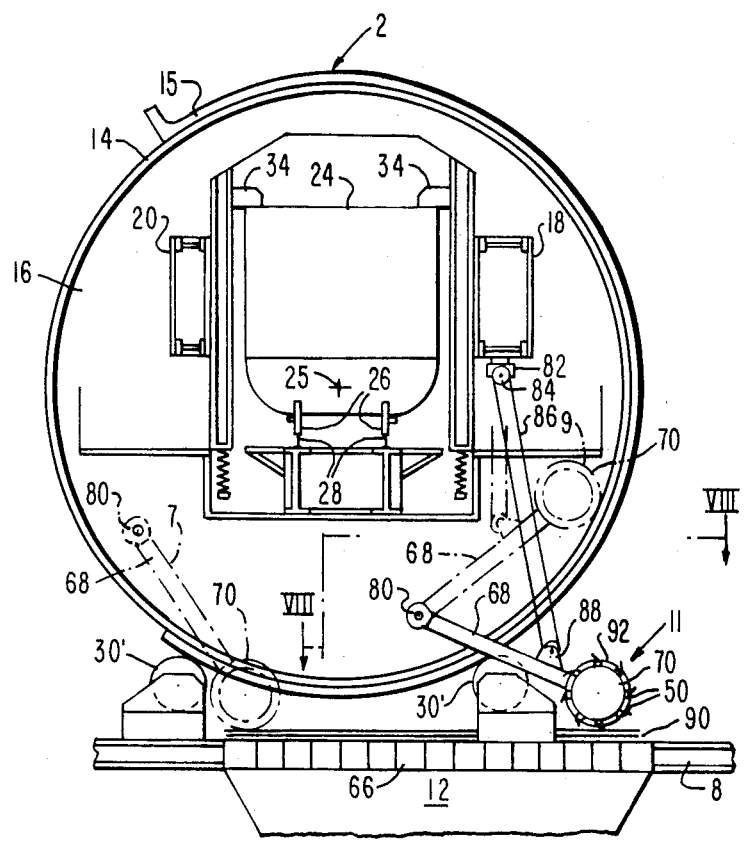
FIG. 7 is an end view of a car dumper depicting another presently preferred embodiment of the impact means.

With the frame 2 in the upright position shown in FIGS. 1, 6 and 7, the track section 28 is aligned with an external track system (not shown) which may extend from one or both ends of the dumper so that the rail car 24 can be positioned within the frame 2. It is common practice, but it is not essential to the present invention, to provide the cars with rotatable couplings and to position the track section 28 in the frame 2 with the coupling axis coextensive with the longitudinal axis 25 of the frame so that the cars can be individually rotated to dump their contents without uncoupling them from a train of cars, which is usual practice in unit trains. The rail car 24 is held in position on the track section 28 during rotation of the frame 2 by a set of clamps 34 which compressively engage to the top of the car, as is well known in the art. As the frame is rotated about the longitudinal axis by the gear reducer units, for instance, in the clockwise direction as viewed in the drawings, the contents of the car are dumped over one side into the hopper pit 12. The bulk material, such as coal, ore and the like, is dumped into the pit and received by hoppers for disposition by take-away equipment in the form of conveyor devices in a conventional, known manner. In order to minimize turn around time during the dumping operation, it is imperative to keep large, oversized lumps of dumped material from entering the hoppers and the take-away system. Such entry may jam the take-away mechanism and cause a shutdown of the unloading operation until these lumps can be cleared. This is particularly a serious problem during the winter months when the contents of the rail cars, such as coal, for example, can become frozen in transit and form relatively large masses of solid material which are quite hard and difficult to break.

Figure 5:
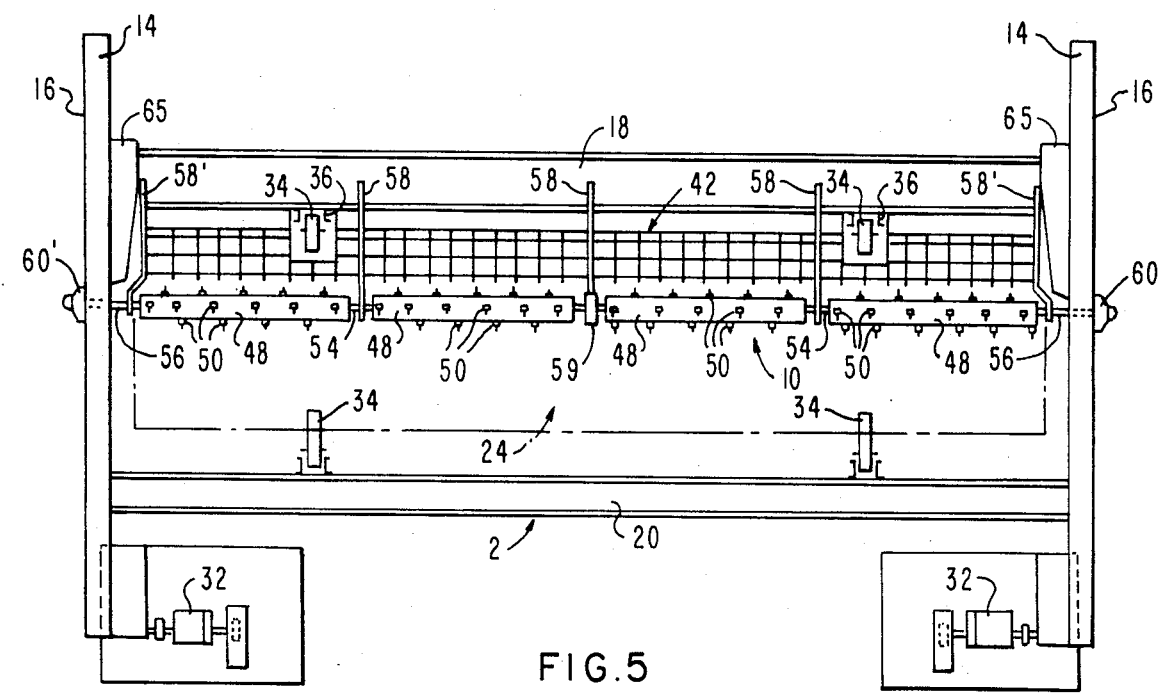
FIG. 5 is a plan view of the car dumper of FIGS. 1-4.

One presently preferred embodiment of the lump breaker/impact means of the present invention, generally designated 10, is depicted in FIGS. 1-5. The lump breaker apparatus includes a porous barrier member, generally designated 42, which is in the form of a grizzly element comprising a plurality of spaced-apart vertical plates 44 and a plurality of intersecting, horizontal bars 46 attached thereto and forming sized openings of approximately 12 inches square therein. Also included are a plurality of horizontally extending grizzly plate members 45 and a lowermost horizontal plate 45' which are weldably secured to the vertical grizzly plates 44. Lowermost plate 45' is attached, by way of bolts 64, to the top of beam 38 which, in turn, is secured to front box girder 18. The face of beam 38 is coextensive with the inner face of the blocking structure formed adjacent the box girder 18, designated as surface 37, FIG. 2. The lump breaker impact means 10 further comprises a plurality of rotatable drum elements 48 which preferably are fabricated from sections of steel pipe. Each drum section 48, for example, may be 18 inches in diameter, with a ½ inch wall thickness, and approximately 11½ feet in length. Around the circumference of the drums 48 are positioned a plurality of replaceable, attack bits 50, formed preferably of a hardened material of a type used in mining applications. A circular hub element 52, which may be solid or spoked, is weldably secured at the ends of each of the drums 48 with a shaft 54 extending outwardly therefrom. The shafts 54 are coextensive with the longitudinal axis of rotation of the drum elements 48. The drum elements are rotatably mounted adjacent to the grizzly 42 by way of a plurality of spaced-apart support plates 58 which are secured to the box girder 18 at their lower ends and to the vertical plate members 44 of the grizzly by way of bolts 62. The upper portion of each support plate 58 has an apertured end to receive the drum shafts 54 therein and to rotatably support the shafts and appropriate bearing means in a conventional manner known in the art. As best seen in FIGS. 1 and 5, the drums 48 of the impact breaker means 10 extend longitudinally end-to-end along an axis of rotation which is parallel to the longitudinal axis 25 of the dumper frame 2 within the confines of the end rings 14 of the dumper. The outermost ends of the array of drums 48, located adjacent each end ring 14, each contain an outwardly extending drive shaft 56 which is driven by drive units 60, 60'. Each drive unit 60, 60' is mounted on the face of one of the opposed end plates 16. The impact means 10 preferably contains an even number of drum elements 48 such as, for example, four drums as depicted in FIG. 1. Use of an even number of drums allows the placement of a central bearing 59, with an equal number of drums on either side thereof. The centrally located bearing 59 is transversely split to permit the independent rotation of the drum shafts 54 on either side. In this manner the two drums 48 to the right of bearing 59 are driven by the unit 60 while the drums to the left of bearing 59 are independently driven by the motor 60', FIGS. 1 and 5. A pair of deflection plates 65 are also provided along the inside of end plates 16 to ensure that the dumped product flow is directed to the grizzly 42, FIG. 5. Clearance spaces are also provided in the grizzly 42 around the vertical arms 36 and hold down clamps 34 of the car dumper in order to prevent interference therewith, FIGS. 1 and 5. Hence, it can be seen, particularly in the detail of FIG. 2, that the porous barrier means in the form of grizzly 42 has vertically upstanding first section which is parallel to the vertical walls of the rail car 24 and a second section, which angularly slopes inwardly above the open top of the car. Closely spaced from the terminal end of the second section of grizzly 42 is the impact means 10 which is rotatably mounted on its shafts 54 and 56 which, in turn, are supported by the plate elements 58.

In the dumping sequence depicted in FIGS. 3 and 4, it can be understood that as the car 24 is rotated by the dumper 2, the bulk material 40 spills over one side of the car and freely flows through the porous grizzly element 42 and into the hopper pit 12 beneath the dumper. Upon visually detecting the presence of large lumps in the bulk material, the dumper operator in cab 6 will activate the impact means 10 by energizing the drum units 60, 60' causing the rotation of the drums 48. Those lumps of bulk material which are greater than the sized openings of the grizzly 42 remain on the grizzly. As the dumper 2 rotates to the lowermost position depicted in FIG. 4, the large retained lumps are strikably impacted by the pointed attack bits 50 of the rotating drums 48 causing the disintegration thereof. The broken pieces then pass through the porous barrier of grizzly 42 and into the hopper bit 12. Any foreign material or stubborn product which is not broken by the impacting means 10 may be returned to the empty car 24 by the operator. Alternatively, the operator may choose to continue with the breaking operation until all of the bulk product material is disintegrated.

In some cases, the bulk material 40 may be relatively difficult to handle, particularly in the transportation and dumping of coal during the winter months in northern locations. In such applications, it may be advantageous to employ a second impact means 10' with an accompanying grizzly element 42 as depicted in FIG. 6. Impact means 10' is positioned on the opposite side of the rail car 24 and constructed in identical fashion as previously described for impact means 10 but would be attached to the inside girder 20 of the vertical support plates 58'. With the dual lump breaker embodiment depicted in FIG. 6, it can be appreciated that very large lumps of material can be rapidly handled and broken by the tandem drums during a dumping cycle.

Figure 8:
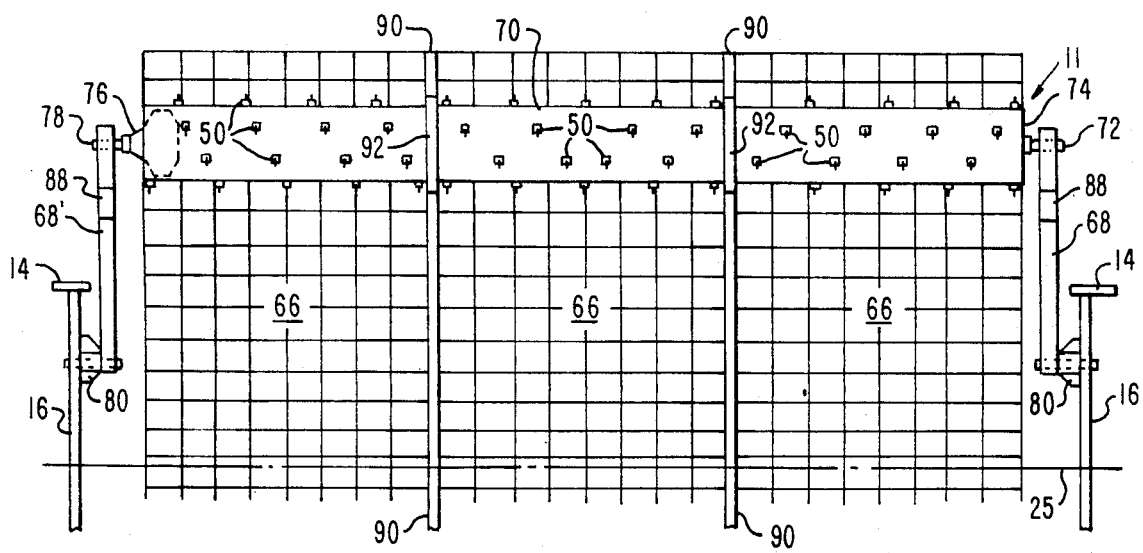
FIG. 8 is a partial sectional plan view of the lump breaker means taken along line VIII—VIII of FIG. 7.

Another presently preferred embodiment of the lump breaker apparatus of the present invention is depicted in FIGS. 7 and 8 in which the impact means is generally designated 11. In this embodiment, a horizontally disposed grate or grizzly 66 is disposed on the top of the hopper pit 12, and forms the porous barrier means to prevent lumps of oversized bulk material from entering into the hopper pit and take-away system below. The impact means 11 comprises an elongated drum 70, which is preferably formed from a continuous length of steel pipe having a diameter of approximately thirty-six inches. The drum 70 extends longitudinally between the vertical planes of the two end plates 16 of the dumper having its longitudinal axis extending generally parallel with the longitudinal axis 25 of the dumper. Drum 70 contains a hydraulic motor 76 fixedly attached within the hollow interior at one end thereof. Motor 76 has a rotatable drive shaft 78 extending outwardly therefrom. A circular hub 74 is secured to the drum 70 at the end opposite the motor 76 and has a shaft 72 outwardly extending therefrom. The breaker drum 70 is mounted for rotation on the first ends of a pair of support arms 68 and 68'. Motor shaft 78 is fixedly secured to the support 68' while shaft 72 is rotatably mounted to support 68. In this manner, the motor 76 and the drum 70 will rotate together, while motor shaft 78 remains stationary relative to the first end of support arm 68'. The second ends of the support arms 68 and 68' are pivotally connected to the end plates 16 of the dumper frame by pivot shafts 80 which are affixed to the end plates, FIG. 8. In such manner, the longitudinal axis of the breaker drum 70 will remain substantially parallel to the longitudinal axis 25 of the car dumper as it pivots about shafts 80. The breaker drum 70 also has a plurality of outwardly extending, hardened attack bits 50 which are adapted to make striking contact with the lumps of product retained on the porous barrier means formed by the hopper grizzly 66.

In order to raise the breaker drum 70 to a parked position indicated by phantom lines 9 in FIG. 7, a hoist motor 82 is provided. Hoist 82 is mounted to the front box girder 18 and includes a rotatable drum element 84. A pulley element 88 is mounted on each of the drum support arms 68 and 68' and receives a wire rope 86 therethrough which is reeved around the hoist drum 84. Selective activation of the hoist motor 82 will cause rotation of the drum 84 in either a first or second direction. Such rotation will selectively raise or lower the breaker drum 70 to the parked position 9 or in the lowered, operable position adjacent the grizzly 66. Due to the fact that the attack bits 50 extend outwardly several inches from the circumference of the breaker drum 70, it is necessary to space the drum 70 away from the top of the grizzly 66 so as to avoid snagging the bits 50 within the bar elements thereof. This is accomplished by providing a pair of track elements 90 along the top surface of the grizzly 66. The tracks 90 are spaced -apart and extend in parallel fashion substantially perpendicular to the longitudinal axis of the dumper frame 2 and the breaker drum 70. The drum 70 is also provided with a pair of wear rings 92 which are fitted around the circumference thereof to ride on the support tracks 90. Hence, as seen in FIG. 7, the tracks 90 and wear rings 92 raise the breaker drum 70 and the outwardly extending attack bits 50 away from and out of contact with the upper surface of the grizzly 66. When the drum is activated, the rings 92 bear against the tracks 90 while rotating with the drum 70 and, thus, prevent abrasive wear to the drum surfaces which would otherwise occur if the drum were to bear directly against the track.

In operation, when the lump breaker drum 70 is in the parked position 9, the wire rope 86 is in its shortest wound position around the hoist drum 84. When the dumper 2 is rotated in the clockwise direction in FIG. 7, the product within the rail car is dumped and, generally, the majority of the bulk material will fall through the sized opening in grizzly 66 and into the hopper 12. The oversized lumps or large masses of frozen material are retained at the top of the grizzly. When the dumper 2 is rotated to its fully dumped position, the operator, upon observing lumps, lowers the drum 70 by activating the hoist motor 82 causing the support arms 68 and 68' to lower the drum 70 such that it will assume the operable position 17 depicted in FIG. 7. The motor 76 of the breaker drum 70 is also activated and the drum begins to rapidly rotate in a clockwise direction while being supported on rings 92 on the support tracks 90. As the dumper 2 is rotated in a counterclockwise direction, back to its upright position, the breaker drum 70 will traverse the top of the grizzly 66 to impact any lumps of material deposited thereon and break them into smaller pieces to permit passage through the openings in the grizzly to the hopper pit 12 therebeneath. When the dumper has been rotated to the upright position of FIG. 7, the breaker drum 70 has traversed the width of the grizzly 66. The dumper 2 is rotated about 80 degrees from the upright position for the lump breaker to make one sweep over the grizzly area 66. At that point, the drum 70 is lifted by activation of the hoist motor 82 to assume its parked position 9. In this manner, the breaker drum 70 can remain in the parked position and out of the path of the bulk material being dumped to permit faster dump cycle times and need only be lowered to the operable position when lumps are observed by the operator. Since the lump breaker 70 travels within the vertical plane of the end of the dumper, no additional clearance between the end rings 14 and the upper surface of the grizzly 66 is required, as is the case in the prior art hammermills.

It can also be appreciated in the embodiment of FIGS. 7 and 8, that the drum 70 is free to move vertically over any unbreakable obstructions which may be in its path on the grizzly 66 by virtue of the flexibility afforded by wire ropes 86 and the pivotal connections 80 of the support arms 68 and 68'. Hence, wire rope 86 provides a degree of vertical float in the breaker drum 70 so as to prevent binding or breakage as might occur if rigid linkage were employed in the hoist mechanism. The lump breaker apparatus of FIGS. 7 and 8 is easily adaptable to be retrofitted on existing rotary dumper installations without the need for any expensive alterations to the foundation or movement of the existing structure.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A rotary car dumper and lump breaker apparatus comprising:
   a rotatable frame comprising a pair of vertically oriented, horizontally spaced end rings connected by elongated girder members to form an open sided cylindrical frame with a horizontal longitudinal axis and having a section of railroad track extending through the frame parallel to said longitudinal axis, said frame including end plates at said end rings enclosing the ends of said cylindrical frame except for an opening through which a railroad car can pass through said frame on said section of track;
   a hopper pit under said cylindrical frame for receiving bulk material carried by said railroad car;
   means for rotating said cylindrical frame on said end rings about said longitudinal axis to discharge bulk material over a top edge of one side of said railroad car into said hopper pit;
   porous barrier means having a plurality of sized openings therein, positioned in the discharge path of the bulk material above the hopper pit; and
   impact means attached to and moveable with the frame of the car dumper and positioned between the end plates thereof; said impact means including motive means to permit selective movement thereof to strikably engage and break lumps of oversized bulk material retained on said porous barrier means during a dumping cycle.

2. The apparatus of claim 1 wherein the porous barrier means is attached to the frame of the dumper, extending along the discharge side of the railroad car to be dumped and includes a first vertical section generally parallel with the side of the car, and an angularly disposed, second section extending vertically upwardly from said first section toward the car and having a terminal end above the top of said car.

3. The apparatus of claim 2 wherein the impact means is positioned adjacent to the terminal end of the second section of the porous barrier means.

4. The apparatus of claim 3 wherein the impact means comprises cylindrically shaped, drum means having a longitudinal axis substantially parallel to the longitudinal axis of the dumper frame and having a plurality of attack bit members outwardly protruding from said drum means to engage said retained lumps of bulk material on the porous barrier means.

5. The apparatus of claim 3 wherein the impact means comprises a plurality of cylindrically shaped, drum members aligned in an end to end array; hub means positioned within the ends of each of the drum members and shaft means outwardly extending from each of said hub means and connecting adjacent drums for rotation about the longitudinal axis of said shafts and hub means; a plurality of spaced-apart support plates attached to and vertically extending from the dumper frame and the porous barrier means, each support plate having an apertured end portion for receiving and supporting therein a rotating shaft means intermediate two adjacent drum members; and said motive means for rotating said drum members includes at least one drive unit mounted on an end plate of the dumper frame and operably engaging an outermost shaft from a drum member adjacent thereto.

6. The apparatus of claim 5 comprising four drum members wherein the shaft means connecting the two adjacent middle drum members includes bearing means to permit the independent rotation of said middle drums with respect to one another and wherein the motive means comprises a pair of drive units, each unit mounted on an opposed end plate of the dumper frame, whereby each respective unit independently drives an adjacent pair of drum members.

7. The apparatus of claim 1 wherein the porous barrier means comprises a pair of substantially identical grizzly elements each attached to the dumper frame extending along opposed sides of the railroad car to be dumped and each including a first vertical section generally parallel with the side of the car and an angularly disposed, second section extending vertically upwardly from said first section toward the car and having a terminal end above the top of said car; and said impact means comprises a pair of substantially identical drum means each postioned adjacent to one of said grizzly elements at the terminal ends thereof.

8. The apparatus of claim 1 wherein the porous barrier means is positioned above the hopper pit, extending in a horizontal plane beneath the cylindrical frame of the car dumper.

9. The apparatus of claim 8 wherein the impact means comprises a rotatable cylindrical drum member having a longitudinal axis generally parallel to the longitudinal axis of the dumper frame; support arm means pivotally connecting said drum member to the end plates of the dumper frame and means for raising and lowering said support arm means, whereby said drum member is selectively moveable between a first, parked position within a circle defined by the end rings and a second, operable position adjacent to the porous barrier means and moveable across said barrier means in a direction transverse to the longitudinal axis of the frame as said car dumper rotates after discharging the bulk material from a car.

10. The apparatus of claim 9 wherein the support arm means comprises a pair of arm members each having a first end pivotally attached to an opposed end plate and each further including a second end attached to shaft means carried by the drum member; and wherein said means for raising and lowering the support arm members comprises a motorized hoist means having a rotatable drum, wire rope means reeved around said hoist drum and around pulley means attached to each of said support arms, whereby, said drum member is raised and lowered to the parked and operable positions, respectively, by selective activation of said hoist means.

11. The apparatus of claim 10 wherein said drum member comprises a hollow pipe having a circular hub element secured to one end thereof and having one of said shaft means extending outwardly from said hub and rotatably attached to the second end of one of said support arm members; the other end of said hollow pipe housing said motive means therewithin and comprising a hydraulic drive unit including the other of said shaft means outwardly extending therefrom and fixedly secured to the second end of the other of said support arm members, whereby, upon activation of said hydraulic drive unit, said pipe and hydraulic drive unit rotate together.

12. The apparatus of claim 9 wherein the drum member includes a plurality of attack bit members outwardly protruding therefrom to strikably engage and break-up said retained lumps of bulk material on the porous barrier means and wherein said apparatus further includes a pair of spaced- apart and parallel support rails positioned on an upper surface of said porous barrier means, extending in a direction transverse to the longitudinal axis of the frame and drum member to support said drum member and to space said attack bits from said porous barrier means when said rotating drum member is in the operable position.

13. The apparatus of claim 12 including a pair of spaced-apart wear rings secured around the drum member to rotatably engage the support rails when the drum member is in the operable position.

* * * * *